Figure 1:
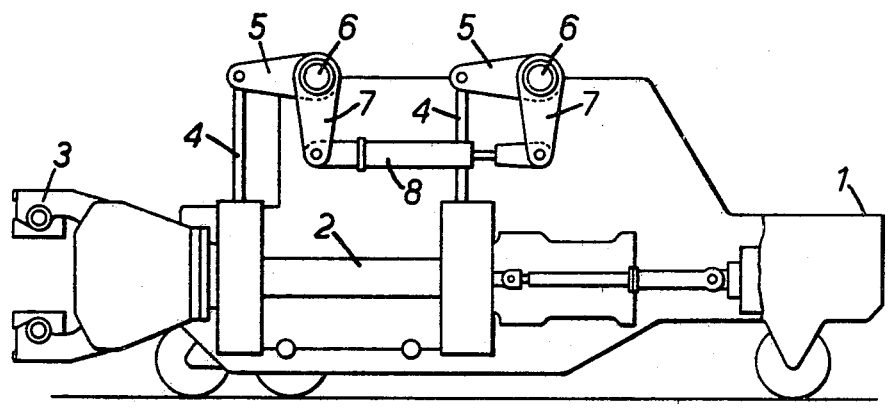

United States Patent [19]

Middleton et al.

[11] 4,231,701
[45] Nov. 4, 1980

[54] MANIPULATOR

[75] Inventors: Anthony E. Middleton, Rotherham; Brian McQuillin, Sheffield, both of England

[73] Assignee: Davy-Loewy Ltd., Sheffield, England

[21] Appl. No.: 899,101

[22] Filed: Apr. 21, 1978

[30] Foreign Application Priority Data

Mar. 31, 1977 [GB] United Kingdom .............. 13574/77

[51] Int. Cl.³ .............................................. B66F 9/00
[52] U.S. Cl. .................................... 414/730; 364/478; 414/739
[58] Field of Search ...................... 414/730, 739, 729; 364/474, 478, 513

[56] References Cited

U.S. PATENT DOCUMENTS

| 3,476,276 | 11/1969 | Stubbs | 414/729 |
| 3,826,383 | 7/1974 | Richter | 414/730 |
| 4,086,522 | 4/1978 | Engelberger et al. | 364/478 X |

*Primary Examiner*—Robert G. Sheridan
*Assistant Examiner*—George F. Abraham
*Attorney, Agent, or Firm*—Lee & Smith

[57] ABSTRACT

A manipulator comprises a carriage on which is mounted a peel having jaws for gripping a workpiece. The peel can move relative to the carriage longitudinally vertically and in tilt. Detectors give signals representing parameters on which the position of the peel depend and a circuit derives from those signals an indication of the position of the jaws, taking into account the angular attitude of the peel. The position indication can be used to control the peel jaws to a required position relative to the carriage.

10 Claims, 5 Drawing Figures

MANIPULATOR

This invention relates to a manipulator for supporting and manipulating a workpiece, as used for example in conjunction with a forging press.

When used for forging a workpiece, the manipulator must be capable of adjusting the position of the workpiece towards and away from the press, in height, and in angle of tilt. To enable those movements to be performed, known manipulators have a carriage which can be moved along a prescribed path, and a peel mounted on the carriage for gripping and supporting a workpiece, the peel being capable of movement relative to the carriage in a direction parallel to the movement of the carriage, in height, and in angle of tilt.

For accurate forging, the position of the workpiece relative to the forge must be continuously and accurately known. Therefore, known manipulators have had detectors for sensing the position of the carriage relative to the ground, and the horizontal position of the peel relative to the carriage. However, with increasing size of manipulator, the length of the peel has become so large that angular attitude of the peel can significantly affect the position of the workpiece relative to the carriage.

A manipulator according to the present invention comprises a carriage movable along a prescribed path; a peel mounted on the carriage for gripping the supporting a workpiece; means for moving the peel relative to the carriage in the direction of movement of the carriage; means for adjusting the vertical position of the peel relative to the carriage; means for adjusting the angular attitude of the peel relative to the direction of movement of the carriage; and a positional indicating and/or control system for the peel including generators for generating signals representing parameters on which the disposition of the peel relative to the carriage depends, and circuit means for deriving from those parameter signals a positional signal representing the position of a point on the peel or workpiece relative to the carriage taking into account an angular disposition of the peel.

Thus, the positional indicating and/or control system may include means for generating a signal representing the position relative to the carriage of that end of the peel opposite that adapted to grip the workpiece, means for generating a tilt angle signal representing the angle of the peel relative to the horizontal, and a computing circuit to which the signals are applied and which is arranged to derive therefrom a signal representing the position relative to the carriage of the gripping end of the peel or of the workpiece.

Where the peel is adjusted in horizontal position relative to the carriage by a hydraulic ram or rams, the horizontal peel position is determined by the effective length of the ram or rams. However, where the peel is adjusted in height relative to the carriage, the angular attitude of the ram or rams alters and the effective length of the ram or rams no longer truly represents the horizontal position of the peel. In that case, the means for generating the peel position signal may comprise a first detector for detecting the effective length of the ram or rams, a second detector for detecting the angle the ram or rams makes to the horizontal and a computing circuit for deriving from the first and second detectors a signal representing the product of the effective length and the cosine of the angle.

Where the peel is capable of slewing relative to the carriage, a further inaccuracy in the detection of the workpiece position arises. There may be then a means for detecting the slew angle of the peel and for compensating the workpiece position signal thereby.

Figure 2:
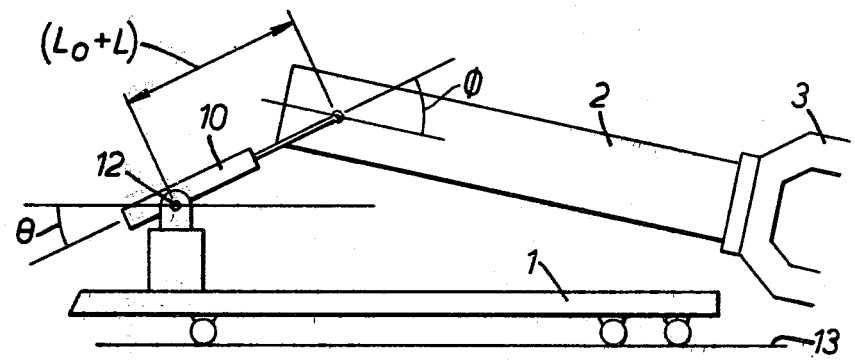
Figure 3A:
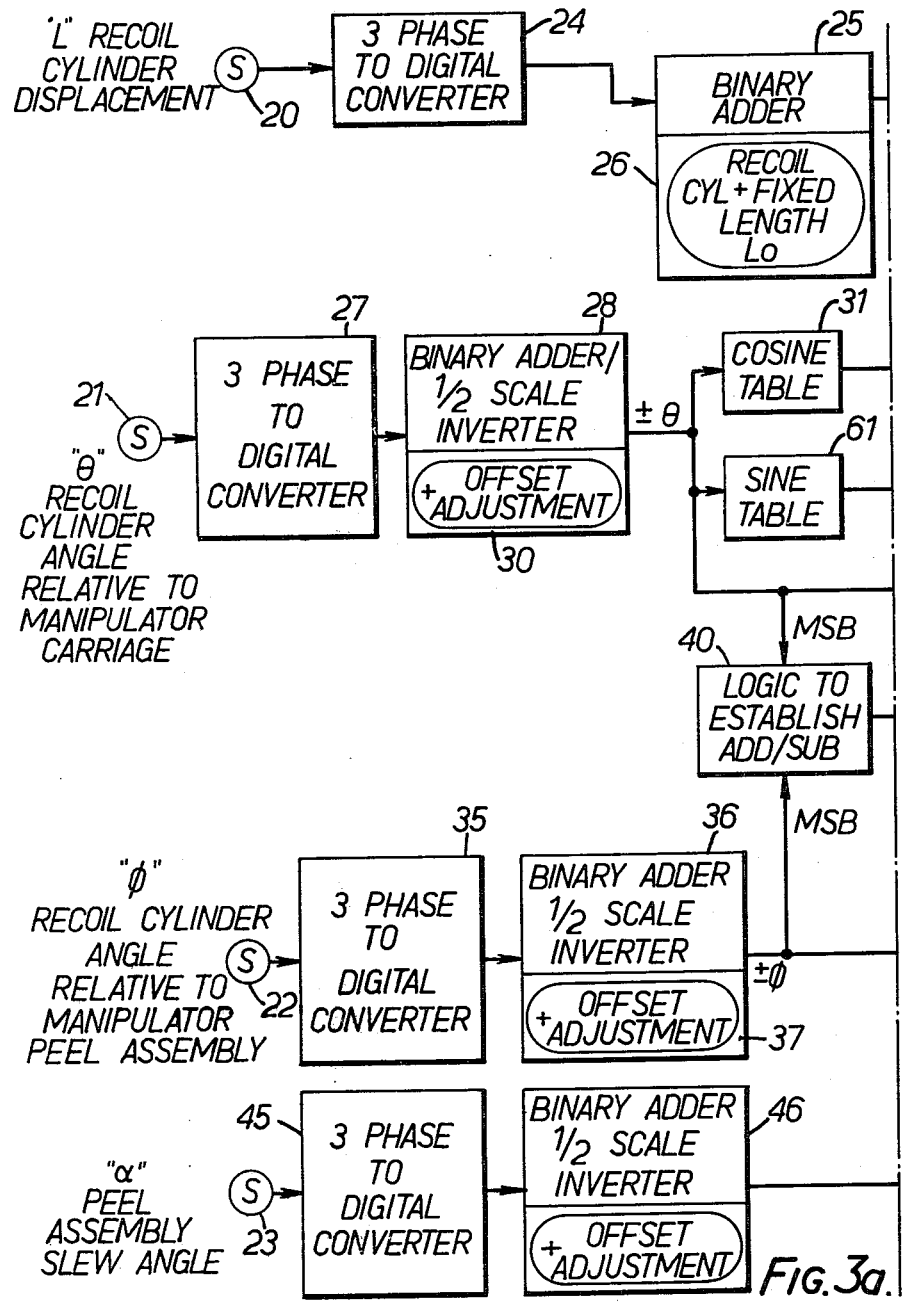
Figure 3B:
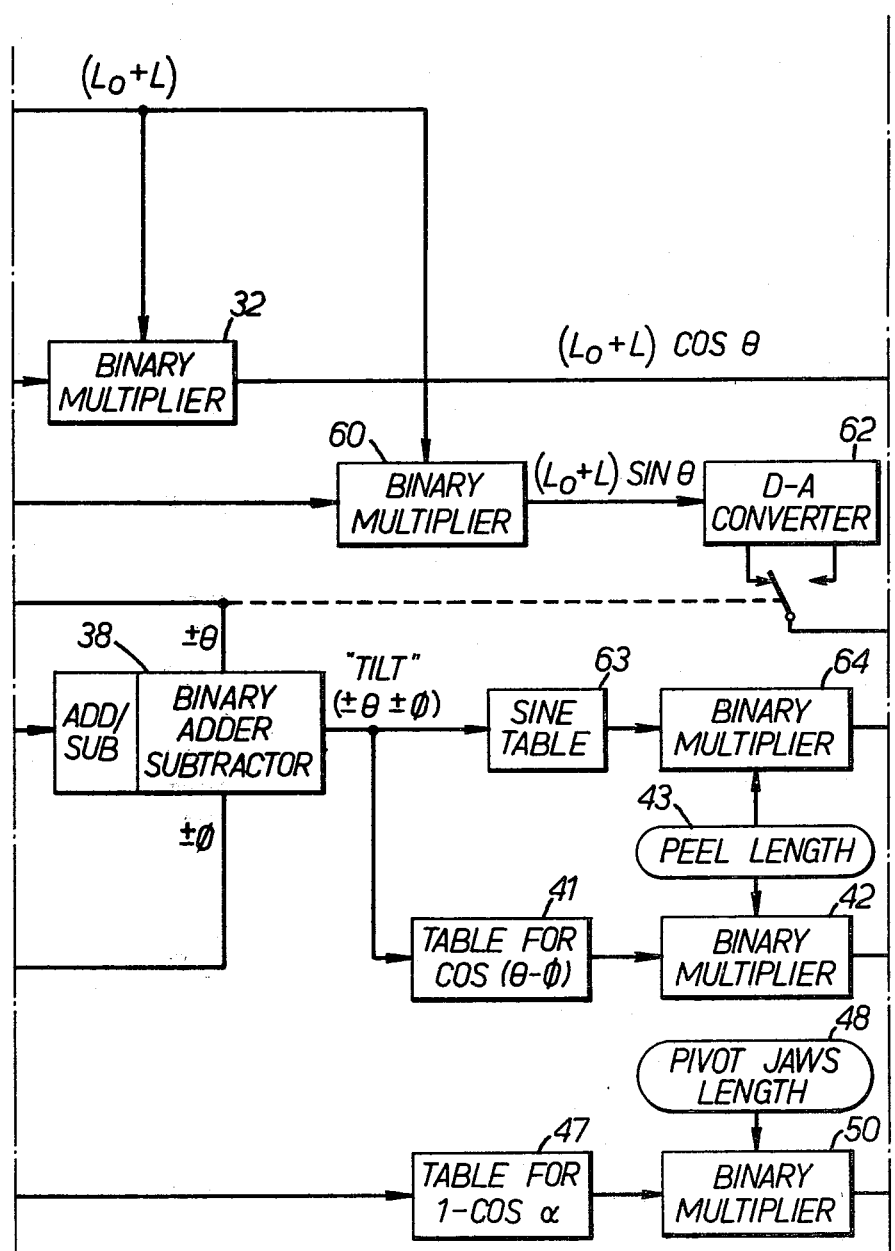
Figure 3C:
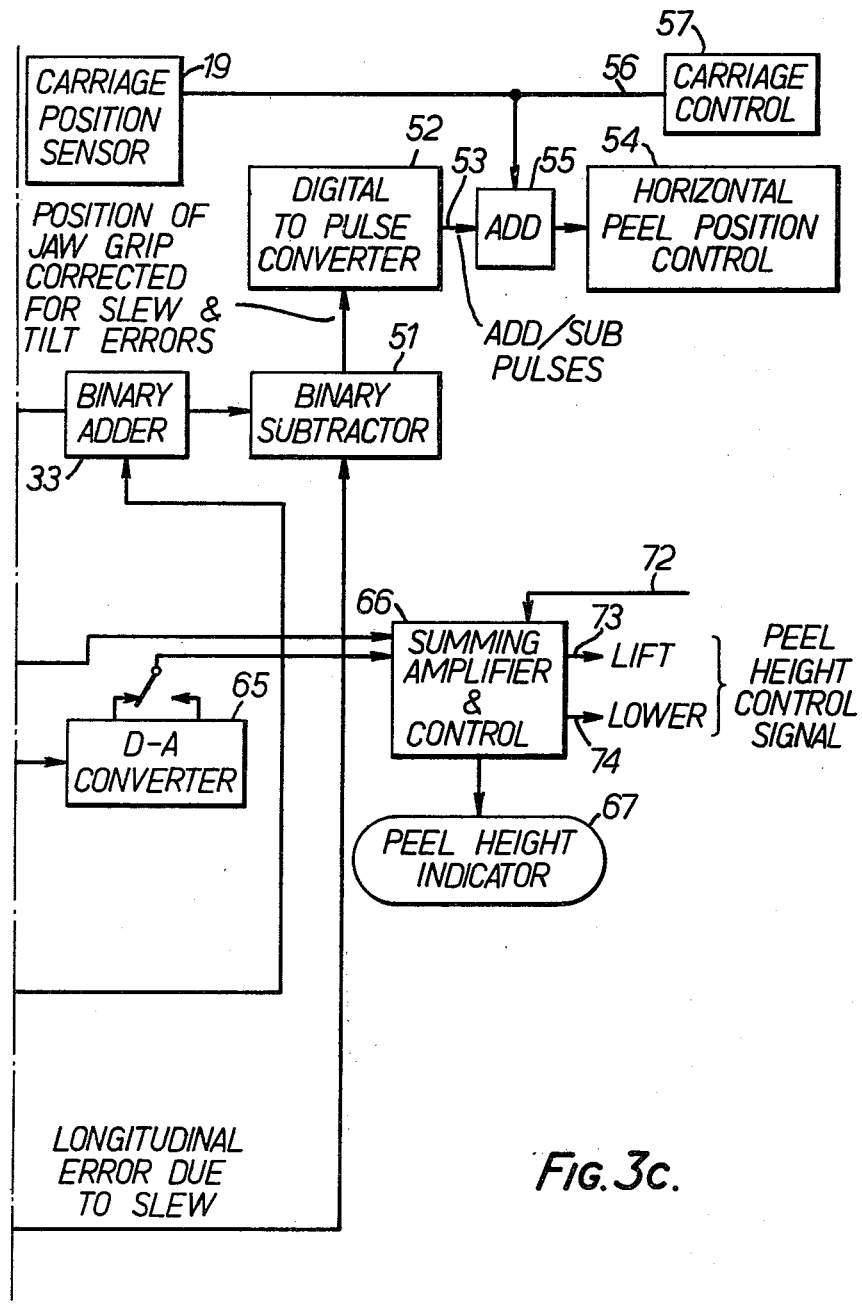

The invention will be more readily understood by way of example from the following description of a workpiece position measuring system in accordance therewith, reference being made to the accompanying drawings, in which:

FIG. 1 shows the manipulator diagrammatically in side view,

FIG. 2 schematically indicates the attitude of the peel relative to the carriage, and FIGS. 3a, 3b and 3c together form a block diagram of the indicating/control system for the manipulator.

The manipulator which is generally as described and illustrated in British Pat. No. 1,186,391 is represented in FIG. 1 by a manipulator carriage 1 which can be driven along a prescribed path on the ground, towards and away from the forging press (not shown). A digital detector 19 (FIG. 3) gives a continuous indication of the position of the carriage relative to ground. A peel 2, having jaws 3 for gripping a workpiece, is suspended by two pairs of links 4 carried by levers 5 which are secured to shafts 6 rotatably supported by the carriage 1. Further levers (not shown) on shafts 6 are connected to hoist rams which when operated rotate the shafts 6. Still further levers 7 fast on the shafts are connected together through tilt cylinders 8 causing the links 5 to act as a parallel linkage. Adjustment of the peel 2 relative to the carriage 1 in the longitudinal direction, i.e. parallel to the movement of the carriage 1 relative to ground, is effected by one or to hydraulic rams 10 acting between the carriage 1 and a predetermined point at the rear end of the peel 2. Side shift hydraulic rams 11 acting between the carriage 1 and the peel can move the peel transversely or give the peel a limited degree of slewing.

The peel can thus be given the following movements:
1. longitudinal movement; by rams 10.
2. vertical movement; by the hoist rams (not shown).
3. tilting movement to the horizontal, by rams 8.
4. transverse movement, by rams 11.
5. slewing movement (rotational movement about a vertical axis), by differential operation of ram 11.

In addition, the peel can rotate about its own axis.

Further information on the construction of the manipulator, reference should be made to the before-mentioned British patent specification.

The carriage 1 and peel 2 are schematically shown in FIG. 2 which demonstrates, in exaggerated manner, the effect of peel tilt on the position of the peel jaws 3 relative to the carriage.

As will be immediately apparent from FIG. 2, the position of the jaws 3, and hence of the workpiece gripped by those jaws, cannot accurately be measured only by detecting the position of the carriage 1 relative to ground and the effective length of the ram or rams 10; the angular disposition ($\theta$) of the ram or rams 10 arising because of the swinging of the levers 5 on height adjustment, and the tilt angle ($\phi$) the peel 2 makes with the rams 10, introduce inaccuracy equal to $$(L_o + L)(1 - \cos \theta) + L_p(1 - \cos(\theta - \phi))$$

where $L_o$ is the fixed length of the cylinder of ram 10 from its pivot point 12, $L$ is the pivot riding length of the piston of ram 10, $L_p$ is the length of the peel 2 between the jaws and the point at which it is effectively pivoted to the ram 10.

In FIG. 2, the angles $\theta$ and $\phi$ are shown much exaggerated. If, in addition, the peel 2 is slewed in the horizontal plane through an angle $\alpha$ a further inaccuracy equal to $L_J(1-\cos \alpha)$ is introduced, where $L_J$ is the length of the peel between the jaws 3 and the position about which the peel slews. Those errors may become sufficiently large to result in inaccurate forging of the workpiece.

A peel position measuring system giving a better accuracy of the position of the jaws 3 relative to the carriage 12 is shown in FIG. 3. The system includes the detector 19 for measuring the position of the carriage 1 relative to ground and the measuring system is used inter alia for the automatic positional control of the manipulator in its direction of movement.

The system includes four synchros as follows:

a synchro 20 measuring the displacement L of the piston of rams 10, a synchro 21 for measuring the angle $\theta$ the ram or rams make with the horizontal, a synchro 22 for measuring the angle $\phi$ the peel 2 makes with the line of the ram or rams 10, and a synchro 23 for measuring the slew angle $\alpha$ of the peel 2.

The three-phase signal from synchro 20 passes to a digital converter 24 and the digital output is applied to a binary adder 25, which also receives from a store 26 a binary signal representing the fixed length $L_o$ of the ram 10. Similarly, the signal from $\theta$ synchro 21 is converted to digital form by converter 27 and applied to binary adder 28, which also receives a signal from device 30, on which is set the offset adjustment necessary to calibrate the synchro 21. The binary signal from adder 28, representing the angle $\theta$, is applied to the device 31, which converts it to a binary signal representing $\cos \theta$. The signals from adder 25, representing $(L_o+L)$, the effective length of the ram or rams 10, and the signal from device 31 are applied to binary multiplier 32 to give an output equal to $(L_o+L) \cos \theta$, the effective horizontal length of the ram or rams. That signal is passed to binary adder 33.

The signal from the $\phi$ synchro 22 is converted to digital form by converter 35 and applied to adder 36, to which an offset adjustment signal is directed by a device 37, and thence to an adder/subtractor 38, which receives a further input from the $\theta$ adder 28. A logic circuit 40 connected to the outputs from adder 28 and adder 36 detect the signs of the $\theta$ and $\phi$ signals and controls adder 38 to perform addition or subtraction functions. The binary output from adder/subtractor 38, representing $(\theta-\phi)$ is passed to circuit 41 to convert the angle signal to $\cos(\theta-\phi)$ and the converter signal is directed to multiplier 42, which also receives a signal from peel length store 43. The output from the multiplier 42 representing $L_p \cos(\theta-\phi)$ is applied as the second input to adder 33.

The signal form the $\alpha$ synchro 23 after conversion in converter 45 to digital form passes to a binary adder 46 which is identical in function with adders 28 and 36, and thence to device 47 which gives an output representing $(1-\cos \alpha)$. The signal from device 47 and the signal from store 48, the latter representing the pivot to jaws length $L_J$, are entered in multiplier 50, the output of which represents $L_J(1-\cos \alpha)$.

The outputs from adder 33 and multiplier 50 are applied to a second subtractor 51, the output from which represents $$(L_o+L)\cos\theta + L_p \cos(\theta-\phi) - L_p(1-\cos\alpha)$$

i.e. the separation in the horizontal direction of the jaws 3 from the pivot point 12, taking into account the angles $\theta$, $\phi$ and $\alpha$. The output is therefore an accurate indication of the horizontal position of the jaws 3 in relation to the carriage. That output signal is converted from digital to pulse form by converter 52, which gives an output signal on line 53. That signal represents the horizontal position of the jaws in relation to the carriage and is applied to an adder 55, to which the signal on line 56 from the carriage position sensor 19 is also applied to give an output representing the position of the jaws 3 in relation to a forging press with which the manipulator is employed; the output from adder 55 is applied to a peel control circuit 54 which controls the movement of the peel to bring the jaws 3 and hence a workpiece carried by the jaws to a required horizontal position in relation to the press. The output on line 56 from carriage position sensor 19 is also applied to a carriage control circuit 57.

As will be apparent from the above, the objective of the manipulator control system is to determine with some accuracy the position relative to the forging press of that part of the workpiece which is to be forged. If the inclination of the workpiece itself significantly affects the accuracy of measurement, compensation for the effective length of the workpiece, i.e. the length $L_W$ of the workpiece between the points at which it is gripped by the jaws 15 and at which it is to be forged, should be made.

That may be done by substituting $(L_P+L_W)$ for $L_P$ and $(L_J+L_W)$ for $L_J$ in the expression given above, and by having the peel length store 43 of FIG. 3 give a signal representing $(L_P+L_W)$ and the store 48 a signal representing $(L_J+L_W)$. As the distance $L_W$ can vary during a forging sequence, $L_W$ must be monitored manually or automatically and the value of $L_W$ continuously fed into stores 43 and 48.

FIG. 3 also shows a circuit for determining the height of the peel jaws, the height signal being employed for peel height control. The signal from adder 25 representing $(L_o+L)$ is applied additionally to a binary multiplier 60, to which is also applied the output of a sine converter 61. The output of adder 28 representing the angle $\theta$ is applied to converter 61 which thus has an output equal to $\sin \theta$. The output of multiplier 60 representing $(L_o+L) \sin \theta$ is converted to analogue form in converter 62.

Similarly, the $(\theta-\phi)$ signal from adder 38 is applied to sine converter 63 and thence to multiplier 64, which also receives an input from peel length store 43. The output of multiplier 64, which represents $$L_P \sin(\phi-\theta) \text{ or } (L_P+L_W)\sin(\theta-\phi),$$

is led to digital to analogue converter 65. The analogue signals from converters 62 and 65 are applied to a summing amplifier and control circuit 66 which outputs firstly to a height indicator 67. A height datum signal is received on input line 72 and is compared with the actual height derived by summing the signals from converters 62 and 65 and any resulting error appears on line 73 or 74 to initiate lifting or lowering respectively of the peel.

In the system described, the positions of the peel horizontally and vertically are determined in part by measuring the angle of tilt $\theta$ of the rams 10 and the extension L of the rams. Other methods of measurement are however possible. For example, because of the geometry of the peel mounting, the horizontal and vertical positions of the pivoted end of the ram 10 have unique values for each value of L and it is therefore possible to dispense with the measurement of $\theta$, but at the cost of a more complicated logic system.

What we claim is:

1. A manipulator comprising
   (a) a carriage movable along a prescribed path;
   (b) a peel mounted on said carriage for gripping and supporting a workpiece;
   (c) means for moving said peel relative to said carriage in the direction of movement of said carriage;
   (d) means for adjusting the vertical position of said peel relative to said carriage;
   (e) means for adjusting an angular attitude of said peel relative to the direction of movement of said carriage; and
   (f) a positional indicating and control system for said peel, including:
   (g) a plurality of generator means, each generating signals representing one parameter of the disposition of said peel relative to said carriage;
   (h) computing means for determining from said parameter signals a positional signal representing the actual position of a point on said peel or on said workpiece relative to the carriage, taking into account an angular disposition of said peel;
   (i) means for producing a locational signal representing the location of said carriage along said prescribed path;
   (j) means for adding said locational signal to said positional signal to produce an output signal representing the position of said point relative to a stationary reference such as the ground; and
   (k) means for controlling the movement of said peel relative to said carriage and to the position of said carriage along the prescribed path in response to said output signal.

2. A manipulator as claimed in claim 1, in which the angular disposition of said peel is the tilt inclination of the peel to the horizontal.

3. A manipulator as claimed in claim 1, in which the angular disposition of said peel is the slew inclination of said peel relative to the direction of movement of said manipulator carriage.

4. A manipulator as claimed in claim 1, in which the angular disposition of said peel is the angle said peel makes with the horizontal direction of movement of said manipulator carriage.

5. A manipulator comprising
   (a) a carriage movable along a prescribed path;
   (b) a peel mounted on said carriage for gripping and supporting a workpiece;
   (c) means for moving said peel relative to said carriage in the direction of movement of said carriage;
   (d) means for adjusting the vertical position of said peel relative to said carriage;
   (e) means for adjusting the angular attitude of said peel relative to the direction of movement of said carriage; and
   (f) a positional indicating and control system for said peel including:
   (g) means for generating a signal representing the position relative to said carriage of that end of said peel opposite that adapted to grip said workpiece,
   (h) means for generating a tilt angle signal representing the angle of said peel relative to the horizontal;
   (i) a computing circuit to which the signals are applied and which is arranged to derive therefrom a positional signal representing the position relative to said carriage of the gripping end of said peel or of said workpiece;
   (j) means for producing a locational signal representing the location of said carriage along said prescribed path;
   (k) means for adding said locational signal to said positional signal to produce an output signal representing the position of the gripping end of said peel or of said workpiece relative to a stationary reference such as the ground; and
   (l) means for controlling the movement of said peel relative to said carriage and to the position of said carriage along the prescribed path in response to said output signal.

6. A manipulator as claimed in claim 5, in which the positional system further includes
   means for generating a slew signal representing the angle of slew of said peel; and
   means for applying said slew signal to said computing circuit.

7. A manipulator as claimed in claim 5, in which the means for moving said peel relative to said carriage in the direction of movement of said carriage comprises a hydraulic ram or rams, the angular attitude of which is dependent on the height of said peel, and said means for generating the position signal representing the position of said opposite peel end comprises a first detector for detecting the effective length of said ram or rams, a second detector for detecting the angle said ram or rams makes to the horizontal and a circuit for deriving from said first and second detectors a signal representing the product of said effective length and the cosine of said angle.

8. A manipulator as claimed in claim 7, in which said means for generating the tilt angle signal comprises:
   a third detector for detecting the angle said peel makes with said ram or rams, and
   a subtracting circuit for giving a signal representing the difference of said angles detected by said second and third detectors.

9. A manipulator as claimed in claim 5, comprising also
   means for deriving a signal representing the height relative to said carriage of said opposite peel end, and a height computing circuit supplied with the last mentioned signal and said tilt angle signal and generating a signal representing the height relative to said carriage of said gripping end or of said workpiece.

10. A manipulator as claimed in claim 8, which further includes:
    a height computing circuit receiving the outputs of said first, second and third detectors and generating a signal representing the sum of firstly the product of said effective length of said ram or rams and the sine of said angle of the ram or rams and secondly the product of the effective length of the peel and the sine of the difference between the angle said peel makes with said ram or rams and the angle of said ram or rams.

* * * * *